(12) United States Patent
Mag et al.

(10) Patent No.: US 9,518,333 B2
(45) Date of Patent: Dec. 13, 2016

(54) ASSEMBLED INTEGRAL PLASTIC ELEMENTS ON AN ANODIZED MOBILE DEVICE ENCLOSURE

(71) Applicant: Apple Inc., Cupertino, CA (US)

(72) Inventors: Stefan C. Mag, San Francisco, CA (US); Derek C. Krass, San Francisco, CA (US); Nicholas G. Merz, San Francisco, CA (US); Daniel W. Jarvis, Sunnyvale, CA (US); Matthew P. Rao, San Francisco, CA (US); Vincent Yan, San Francisco, CA (US); Michael Ngo, Santa Clara, CA (US); Richard Hung Minh Dinh, Saratoga, CA (US); Thomas Johannessen, Fjerdingby (NO)

(73) Assignee: Apple Inc., Cupertino, CA (US)

(*) Notice: Subject to any disclaimer, the term of this patent is extended or adjusted under 35 U.S.C. 154(b) by 12 days.

(21) Appl. No.: 14/503,009

(22) Filed: Sep. 30, 2014

(65) Prior Publication Data

US 2016/0089834 A1   Mar. 31, 2016

(51) Int. Cl.
   *C25D 11/02* (2006.01)
   *B23K 26/32* (2014.01)
   (Continued)

(52) U.S. Cl.
   CPC ......... *C25D 11/022* (2013.01); *B23K 26/3293* (2013.01); *B32B 37/02* (2013.01);
   (Continued)

(58) Field of Classification Search
   CPC .............................. C25D 11/02; C25D 11/022
   (Continued)

(56) References Cited

U.S. PATENT DOCUMENTS

| 2003/0000409 A1 | 1/2003 | Blake et al. |
| 2012/0127040 A1* | 5/2012 | Tang ...................... H01Q 1/243 343/702 |

(Continued)

FOREIGN PATENT DOCUMENTS

| JP | H07331488 | 12/1995 |
| JP | 2010126739 | 6/2010 |

OTHER PUBLICATIONS

PCT Application No. PCT/US2014/063735—International Search Report & Written Opinion dated Aug. 4, 2015.

*Primary Examiner* — Christopher Schatz
(74) *Attorney, Agent, or Firm* — Downey Brand LLP

(57) ABSTRACT

Methods and systems for manufacturing composite parts that include anodizable portions and non-anodizable portions such that an interface between the anodizable portions and non-anodizable portions are free of visible defects are described. The non-anodizable portions can be made of anodizable metals such as aluminum or aluminum alloy. The non-anodizable portions are made of material that do not generally form an anodic film, such as plastic, ceramic or glass materials. In particular, the methods described relate to manufacturing methods that are compatible with anodizing processes and avoid defects related to anodizing processes. In particular embodiments, the methods involve avoiding trapping of anodizing chemicals within a gap between an anodizable portion and a non-anodizable portion, which prevents the anodizing chemicals from disrupting the uptake of dye in a post-anodizing dyeing process.

20 Claims, 18 Drawing Sheets

(51) Int. Cl.
  *B32B 37/02* (2006.01)
  *C25D 11/04* (2006.01)
  *C25D 11/24* (2006.01)
  *C25D 11/26* (2006.01)
  *C25D 11/30* (2006.01)
  *C25D 11/34* (2006.01)
  *B29C 65/78* (2006.01)

(52) U.S. Cl.
  CPC .............. *C25D 11/02* (2013.01); *C25D 11/04* (2013.01); *C25D 11/243* (2013.01); *C25D 11/26* (2013.01); *C25D 11/30* (2013.01); *C25D 11/34* (2013.01); *B29C 65/7847* (2013.01)

(58) Field of Classification Search
  USPC ........................................................ 156/152
  See application file for complete search history.

(56) References Cited

U.S. PATENT DOCUMENTS

| | | | |
|---|---|---|---|
| 2013/0153428 A1* | 6/2013 | Akana | C25D 11/20 205/50 |
| 2014/0076731 A1 | 3/2014 | Russell-Clarke et al. | |
| 2014/0126172 A1 | 5/2014 | Fahlgren et al. | |

\* cited by examiner

ASSEMBLED INTEGRAL PLASTIC ELEMENTS ON AN ANODIZED MOBILE DEVICE ENCLOSURE

FIELD

This disclosure relates generally to manufacture of composite parts having non-metal portions and metal portions, where the metal portions are anodized. In particular embodiments, the methods and systems described can be used in the manufacture of enclosures for consumer products, such as enclosures for consumer electronic products.

BACKGROUND

Many commercial products include portions that are made of more than one type of material, such as metal portions and plastic portions, which are assembled together into a single part. Often, an anodizing process is used to provide a protective and cosmetically appealing surface finish to the metal portions of these composite parts. During an anodizing process, a metal part is exposed to an electrolytic process whereby the metal part acts as an anode. The process forms a metal oxide film or anodic film on surfaces of metal. The metal oxide layer can enhance the durability and corrosion resistance of the part. In addition, the metal oxide layer has a porous structure that can accept any of a number of dyes. These dyes can be infused within the porous structures of the metal oxide to give the part a particular color.

Although anodizing can provide numerous benefits, the anodizing process itself can complicate the manufacturing process when a part is a composite part that includes portions made of materials that are not anodizable, such as plastic, glass or ceramic. This can be especially problematic when the anodizable metal portions are directly adjacent the non-anodizable portions. This arrangement creates gaps, even if small, between the anodizable metal portions and non-anodizable portions where chemicals from an anodizing process can get trapped. The trapped chemicals can leak out or otherwise disrupt subsequent operations. For example, the trapped chemicals can inhibit the uptake of dyes within portions of the anodic films and create visible defects, which detract from the cosmetic appearance of the composite parts.

SUMMARY

This paper describes various embodiments that relate to systems and methods of assembling a part having a non-metal portion, such as a plastic portion, and a metal portion that is anodizable. The systems and methods described can be used in the manufacture of enclosures for electronic devices.

According to one embodiment, a method of manufacturing a composite part that includes a non-anodizable portion coupled with an anodizable portion is described. The method includes co-machining a surface of the non-anodizable portion with a surface of the anodizable portion such that the surface of the non-anodizable portion cooperates with the surface of the anodizable portion to form a continuous surface. The method also involves decoupling the non-anodizable portion from the anodizable portion. The method further includes anodizing the anodizable portion forming an anodic film on at least the surface of the anodizable portion that was co-machined. The method additionally includes securing the non-anodizable portion with the anodizable portion such that the continuous surface is reformed.

According to an additional embodiment, a method of manufacturing a composite part that includes a non-anodizable portion and an anodizable portion is described. The method includes forming an anodic film on the anodizable portion. The anodic film has a surface corresponding to an exterior surface of the part. The method also includes securing the non-anodizable portion with the anodizable portion. The non-anodizable portion has a shape that is approximate a final shape. The method further includes removing a portion of the non-anodizable portion such that the non-anodizable portion takes on the final shape. The removing includes contacting the surface of the anodic film and a surface of the non-anodizable portion with an abrasive material that preferentially removes non-anodizable portion over the anodic film such that the surface of the anodic film and the surface of the non-anodizable portion cooperate to form a contoured surface.

According to a further embodiment, a method of manufacturing a composite part that includes a non-anodizable portion and an anodizable portion is described. The anodizable portion includes a pocket. The method includes positioning the non-anodizable portion within the pocket of the anodizable portion. The method further includes applying a first pressure in a first direction to non-anodizable portion such that a surface of the non-anodizable portion is in an inset position with respect to a surface of the anodizable portion. The method additionally includes aligning the part with a datum surface having a shape corresponding to a contoured surface. The method also includes applying a second pressure in a second direction opposite the first direction to the non-anodizable portion against the datum surface such that the surface of the non-anodizable portion and the surface of the anodizable portion cooperate to form the contoured shapes These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
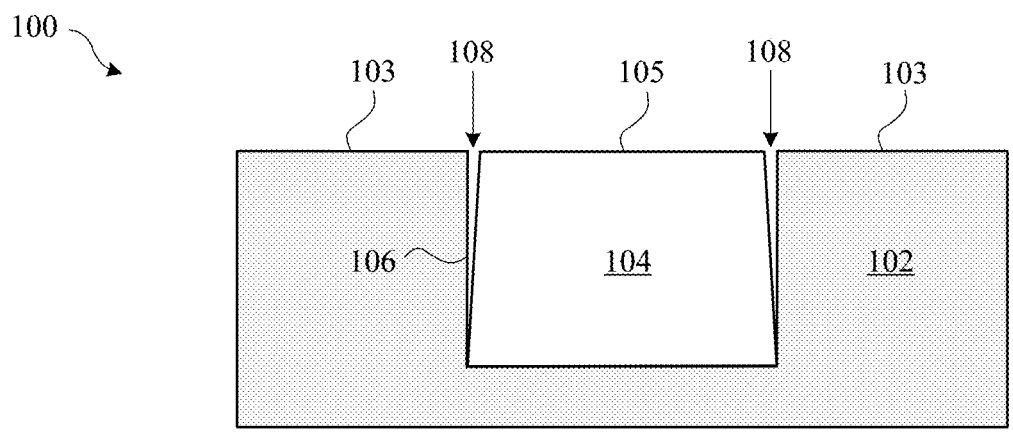
FIGS. 1A-1D show a composite part undergoing an anodizing process.

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

Described herein are methods and systems for manufacturing composite parts that include anodizable portions (e.g., made of an anodizable metal such as aluminum or aluminum alloy) and non-anodizable portions (e.g., made of plastic, ceramic or glass) such that interfaces between the anodizable portions and the non-anodizable portions are free of visible defects. In particular, the methods relate to manufacturing methods that are compatible with anodizing processes so as to avoid defects related to anodizing processes. In particular embodiments, the methods involve avoiding trapping of anodizing chemicals within a gap between an anodizable portion and a non-anodizable portion, which prevents the anodizing chemicals from disrupting the uptake of dye in a post-anodizing dyeing process. The result is a composite part that is cosmetically appealing and free of visible defects.

In some embodiments, the non-anodizable portion is removed from the anodizable portion prior to an anodizing process so that the non-anodizable portion is not subject to the anodizing process. The non-anodizable portion can then be reassembled with the anodizable portion after the anodizing process is complete. In other embodiments, the methods involve assembling the anodizable and non-anodizable portions together prior to an anodizing process such that a gap between the anodizable and non-anodizable portions is filled. This way, when the assembled composite part is subject to an anodizing process, anodizing chemicals are prevented from entering the gap and thereby prevented from disrupting a subsequent dyeing process. In these embodiments, the non-anodizable portions should be made of a material that is compatible with an anodizing process, such as certain types of plastics.

The methods described herein are well suited for providing both protective and attractive surfaces to visible portions of consumer products. For example, methods described herein can be used to provide protective and cosmetically appealing exterior portions of metal enclosures and casings for electronic devices, such as those manufactured by Apple Inc., based in Cupertino, Calif. In particular embodiments, the methods are used to form protective coatings for exterior metallic surfaces of computers, portable electronic devices and/or accessories for electronic devices.

These and other embodiments are discussed below with reference to FIGS. 1-9. However, those skilled in the art will readily appreciate that the detailed description given herein with respect to these Figures is for explanatory purposes only and should not be construed as limiting.

As described above, anodizing can provide durable and cosmetically appealing coatings to metal surfaces. However, the anodizing process itself can cause difficulty when manufacturing composite parts that include anodizable portions, such as those made of anodizable metal material like aluminum or aluminum alloy, and non-anodizable portions, such as those made of plastic, ceramic or glass. To illustrate, FIGS. 1A-1D show part 100, which includes anodizable portion 102 and non-anodizable portion 104, undergoing an anodizing process.

FIG. 1A shows a cross-section view of part 100 prior to an anodizing process. Non-anodizable portion 104, which can correspond to a plastic, glass or ceramic material, is positioned within pocket 106 formed within anodizable portion 102. Anodizable portion 102 can correspond to an anodizable material such as aluminum or aluminum alloy. Gaps 108 form between anodizable portion 102 and non-anodizable portion 104 when assembled together. Even if anodizable portion 102 and non-anodizable portion 104 are in contact along an interface between anodizable portion 102 and non-anodizable portion 104, small gaps 108 will form.

Figure 1B:
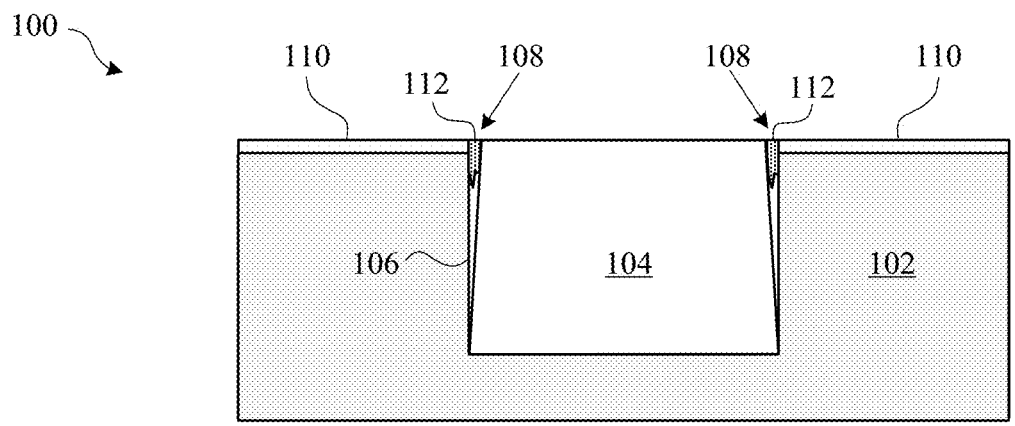

FIG. 1B shows a cross-section view of part 100 after an anodizing process where exposed surface portions of anodizable portion 102 are converted to anodic film 110. During the anodizing process, part 100 is immersed in an anodizing electrolyte and a voltage is applied such that exposed surfaces of anodizable portion 102 oxidize to a corresponding metal oxide material. During the anodizing process chemicals 112 get trapped within gaps 108 and are not easily removable using rinsing or other standard techniques if gaps 108 are small. Note that since non-anodizable portion 104 is also immersed in the anodizing electrolyte and subject to anodizing conditions, non-anodizable portion 104 needs to be made of a material that is chemically resistant to becoming denatured or damaged by such exposure.

Figure 1C:
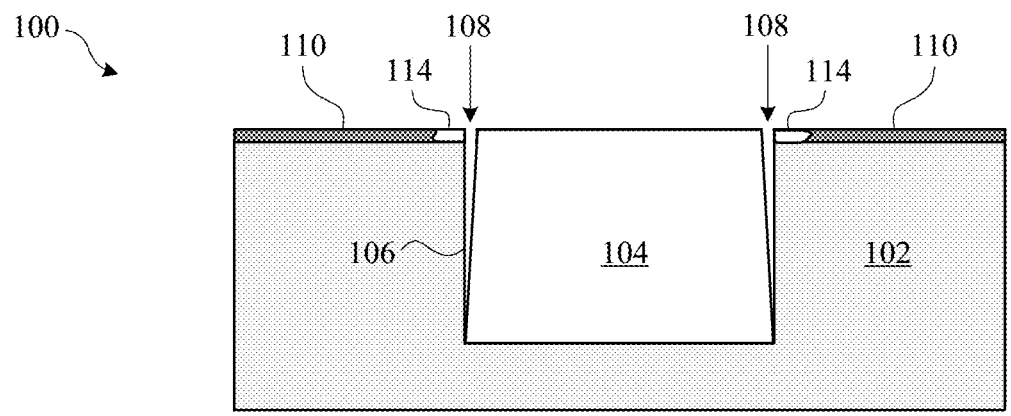
Figure 1D:
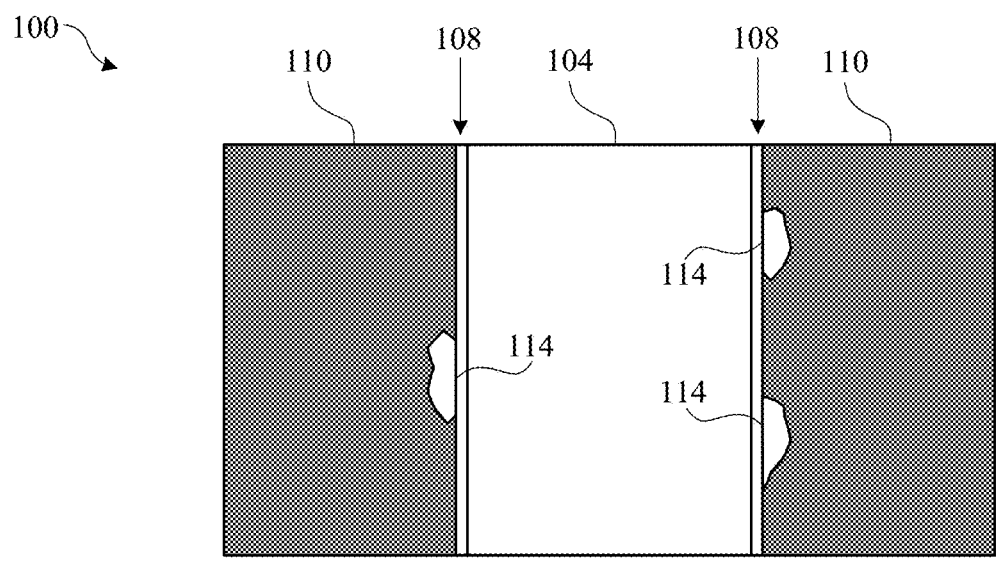

FIG. 1C shows a cross-section view of part 100 after a dyeing process where dye is infused within anodic film 110 to give anodic film 110 a desired color. During the dyeing process, chemicals 112 can spread into adjacent portions of anodic film 110 and inhibit the uptake of dye in these areas forming visible defects 114 that can appear as irregular shaped blotches. FIG. 1D shows a top-down view of part 100 with dyed anodic film 110 and visible defects 114 formed at an interface between anodic film 110 and non-anodizable portion 104.

The methods described herein involve forming a composite part such that the visible defect problems associated with anodizing processes described above are eliminated. In some embodiments, the methods involve removing the non-anodizable portion of the part, anodizing the anodizable portion, and then reassembling the non-anodizable portion back into the part. These embodiments are described below with reference to FIGS. 1-7. In other embodiments, the methods involve filling the gap at the interface between the non-anodizable and anodizable portions, and then anodizing the composite part. Since the gap is filled, this prevents anodizing chemicals from entering and getting trapped within the gap. These embodiments are described below with reference to FIGS. 8-9.

Figure 2A:
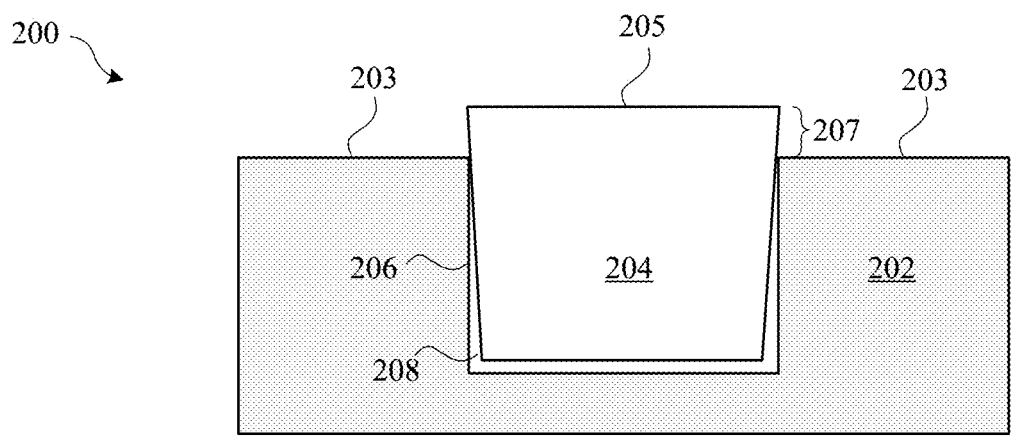
FIGS. 2A-2F show a composite part undergoing an anodizing manufacturing process, in accordance with described embodiments.

FIGS. 2A-2F show part 200, which includes anodizable portion 202 and non-anodizable portion 204, undergoing an anodizing manufacturing process in accordance with described embodiments. FIG. 2A shows a cross-section view of part 200 after non-anodizable portion 204 is positioned within pocket 206 formed within anodizable portion 202. Anodizable portion 202 can be made of any suitable anodizable material, including metals such as aluminum, titanium, zinc, magnesium, niobium, zirconium, hafnium, tantalum, and suitable alloys thereof. In some embodiments, anodizable portion 202 is made of an aluminum alloy having sufficient strength for forming an enclosure or a portion of an enclosure for a consumer product, such as a consumer electronic device. Anodizable portion 202 can be shaped to have pocket 206 using any suitable technique, including machining techniques that give anodizable portion 202 a shape roughly corresponding to a final shape of anodizable portion 202.

Non-anodizable portion 204 can be made of any suitable material that is generally not anodizable, such as plastic, glass, and/or ceramic. In some embodiments, non-anodizable portion 204 is made of a plastic material having sufficient strength and durability for forming exterior portions of an enclosure or a portion of an enclosure for a consumer product, such as a consumer electronic device. In some embodiments non-anodizable portion 204 is made of a relatively rigid material, such as hard plastic, while in other embodiments non-anodizable material is made of a relatively compliant material, such as a soft plastic, silicone, or rubber. In some embodiments, the material for non-anodizable portion 204 is chosen for other physical properties such as electrical capacitance, dielectric constant, radio frequency (RF) transparency, color, and/or resistance to fading. In particular embodiments, non-anodizable portion 204 is made of a substantially RF transparent material, such as an RF transparent plastic material, so that RF communication can pass through non-anodizable portion 204 to and/or from an RF antenna positioned within the electronic device. In some embodiments, non-anodizable portion 204 is dyed to have a color that matches that of a subsequently formed dyed anodic film that is adjacent non-anodizable portion 204.

In some embodiments, non-anodizable portion 204 starts out as a rigid material that is pressed within pocket 206. In other embodiments, non-anodizable portion 204 starts out as a molten material that is molded into pocket 206 using, for example an injection molding process, and allowed to harden within pocket 206. This can give non-anodizable portion 204 a shape that is near a final shape (near net shape). In some embodiments, pocket 206 and/or non-anodizable portion 204 are shaped to provide clearance 208 between non-anodizable portion 204 and anodizable portion 202 within pocket 206. Clearance 208 can be provided to accommodate the formation of an anodic film formed within pocket 206 in a subsequent anodizing process. In addition, or alternatively, clearance 208 can provide room for a subsequently applied adhesive used in some embodiments to adhere non-anodizable portion 204 with anodizable portion 202. The size and shape of clearance 208 can vary depending upon design requirements. According to some embodiments, surface 205 of non-anodizable portion 204 is not flush with surface 203 of anodizable portion 204. For example, surface 205 of non-anodizable portion 204 can extend above at an offset a distance 207 from surface 203 of anodizable portion 204. In other embodiments (not shown), surface 203 of anodizable portion 204 extends above surface 205 of non-anodizable portion 204.

Figure 2B:
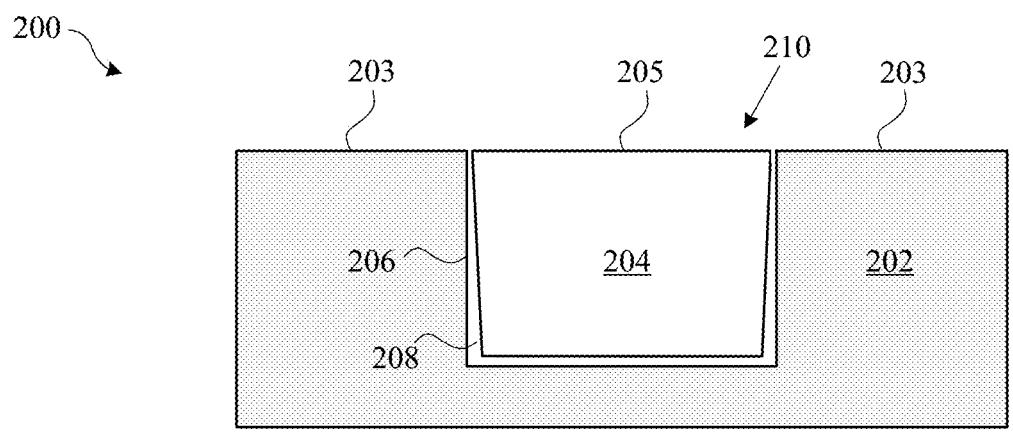

FIG. 2B shows part 200 after a co-machining process where non-anodizable portion 204 and anodizable portion 202 are machined together such that surface 203 and surface 205 cooperate to form a continuous surface 210. Continuous surface 210 can be machined to have any suitable shape using any suitable machining process. In some cases, continuous surface 210 is planarized, using for example a grinding or polishing operation, to form a substantially flat or planar shape. In other cases, continuous surface 210 is machined and/or polished/ground to have a curved shaped. Non-anodizable portion 204 can be secured within pocket 206 during the machining operation using any suitable method, including use of an adhesive, one or more fasteners, or by pressing non-anodizable portion 204 within pocket 206 such that non-anodizable portion 204 is held in place by friction.

Figure 2C:
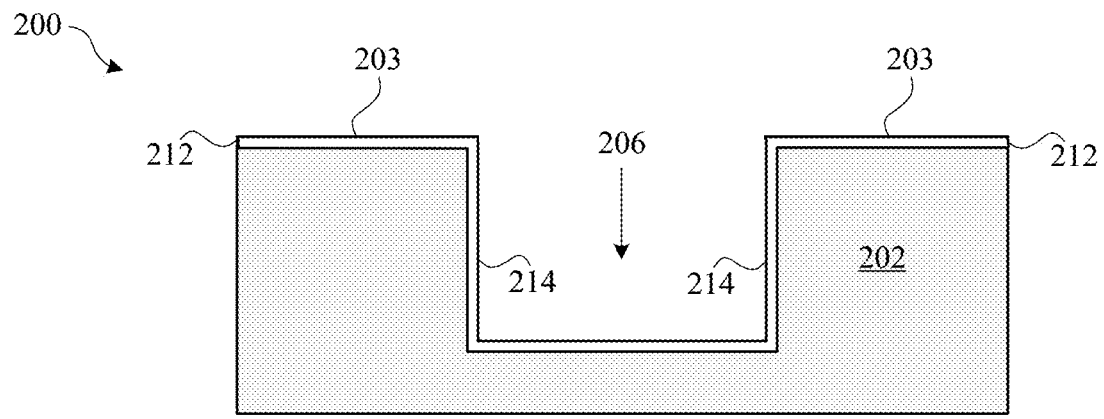

After continuous surface 210 is formed, at FIG. 2C non-anodizable portion 204 is removed from pocket 206 and anodizable portion 204 is exposed to an anodizing process. During anodizing, anodizable portion 202 is placed in an electrolytic bath and a voltage is applied such that exposed surface portions of anodizable portion 202 are converted to anodic film 212, including at surface 203. Anodic film 212 can correspond to a protective outer coating for part 200. In some embodiments, surface 214 of anodizable portion 202 within pocket 206 are also anodized such that anodic film 212 covers interior surface of pocket 206. In other embodiments, surface 214 is masked (not shown) prior to anodizing such that anodic film 212 forms only on surface 203 and does not form within pocket 206. Any suitable anodizing process can be used. In particular embodiments, anodizing processes that are conducive to forming anodic film 203 of sufficient durability and aesthetic appeal for an enclosure for an exterior surface for an enclosure for a consumer electronic product is used.

After anodizing, in some embodiments one or more operations can be performed to compensate for changes in the dimensions of pocket 206 due to the addition of anodic film 212 within the pocket 206. For example, interior walls of pocket 206 can be machined or etched (e.g., laser etched) to remove portions of, or all of, anodic film 206 within pocket 206. After anodizing, part 200 can be rinsed and cleaned.

Figure 2D:
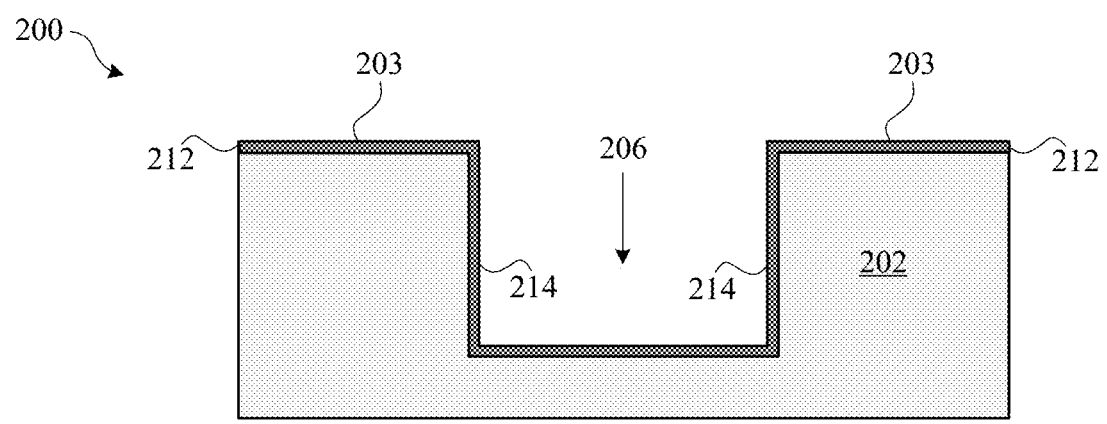

At FIG. 2D, anodic film 212 can optionally be dyed using any suitable dyeing process. Many anodic dyeing processes involve infusing dye particles, such as organic or inorganic pigments, into anodic pores within anodic film 212. In some embodiments, anodic film 212 is dyed to have substantially the same color as a color of non-anodizable portion 204. Since anodizing chemicals are not trapped in any gaps, the dye particles are unimpeded from infusing within anodic film 212. Thus, the dye can be evenly infused within anodic film 212 giving anodic film 212 a continuous dyed color. In some embodiments, one or more sealing operations can be used to seal the anodic pores within anodic film 212 after the dyeing process.

Figure 2E:
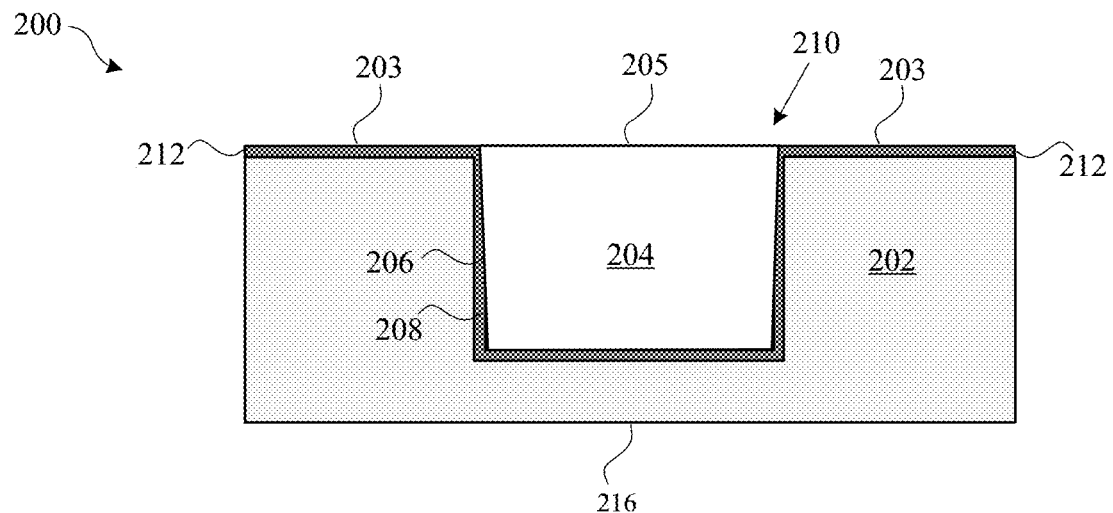
Figure 2F:
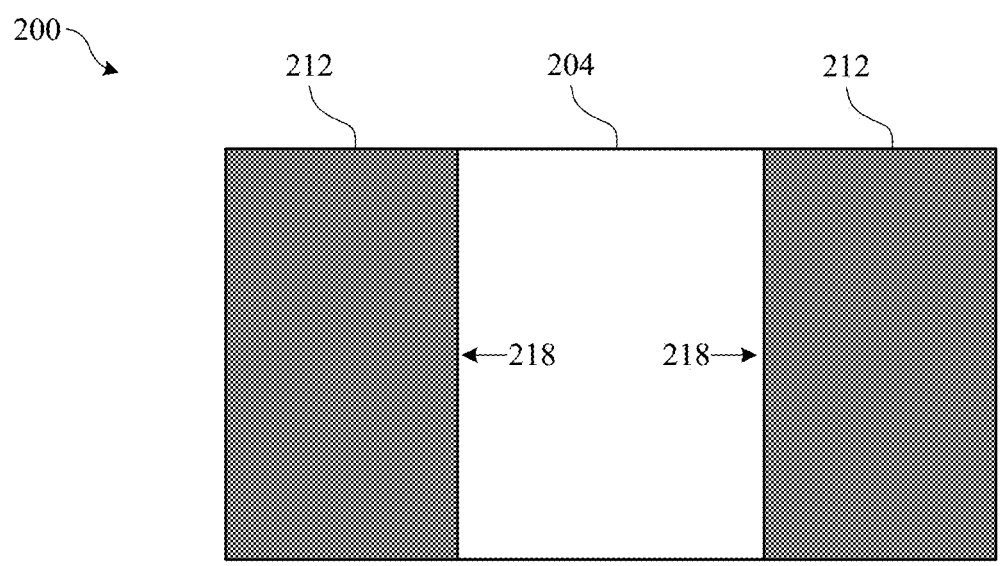

At FIG. 2E, non-anodizable portion 204 is replaced within pocket 206 such that surface of non-anodizable portion 204 is substantially flush with surface 203 of anodic film 212, thereby reforming continuous surface 210. Since non-anodizable portion 204 is assembled within part 200 after an anodizing process, there is no gap where anodizing chemicals can get trapped. Thus, anodic film 212 retains its evenly dyed color without visible defects associated with the anodizing process. FIG. 2F shows a top-down view of part 200 with dyed anodic film 212 with no visible defects at an interface region 218 between anodic film 212 and non-anodizable portion 204.

In some cases, non-anodizable portion 204 is inserted within pocket 206 using a "soft tooling" technique where tools made of a relatively soft material such as silicone are used to position, insert and/or press non-anodizable portion 204 within pocket 206. This way, anodic film 212 is prevented from damage due to contact with harder tools. In some embodiments, non-anodizable portion 204 is secured within pocket 206 by frictional force, such as by press fitting. In other embodiments, non-anodizable portion 204 is secured within pocket 206 using one or more other mechanisms, which will be described in detail below with reference to FIGS. 3A-3D. In some embodiments, a fixture is used to properly position non-anodizable portion 204 within pocket 206. Some of these embodiments are described below with reference to FIGS. 4A-4E.

Note that since non-anodizable portion 204 is not subject to an anodizing process, non-anodizable portion 204 is not limited to materials that are chemically resistant to anodizing electrolytes and anodizing conditions, unlike non-anodizable portion 104 described above with reference to FIGS. 1A-1D. This allows for use of a broader set of materials that can be used to form non-anodizable portion 204. For example, non-anodizable portion 104 can be limited to polyether ether ketone (PEEK), polyphenylsulfone (PPSU), and plastic materials that are generally chemically resistant to anodizing processes. In contrast, the scope of materials for non-anodizable portion 204 can be broadened vastly. For example, suitable materials can include anodizing resistant materials such as PEEK and PPSU and also other materials such as silicone-based materials, polycarbonate, acrylonitrile butadiene styrene (ABS), polyetherimide (PEI), and polysulfone (PS), to name a few.

After non-anodizable portion 204 is inserted within pocket 206, in some cases one or both of surfaces 203 and 205 are finished again, using for example a gentle buffing operation, to assure that continuous surface 210 is sufficiently retained and continuous without significant offset between surfaces 203 and 205. If not already done, in some embodiments anodic film 212 infused with dye to impart a desired color to anodic film 212 and/or sealed using a sealing process.

Figure 3A:
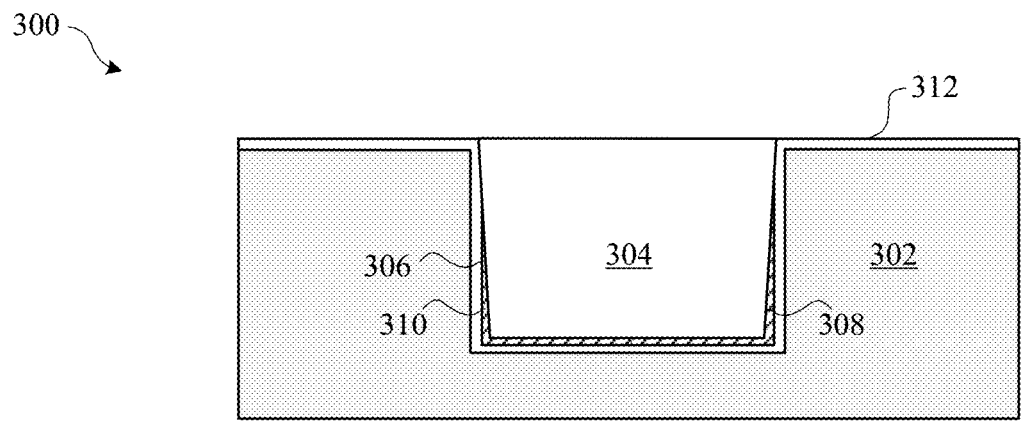
FIGS. 3A-3D show composite parts having securing mechanisms, in accordance with described embodiments.

As described above, in some embodiments, a non-anodizable portion can be secured to an anodizable portion of a composite part using one or more mechanisms. FIGS. 3A-3D illustrate some suitable securing mechanisms. FIG. 3A shows part 300, which includes non-anodizable portion 304 inserted within pocket 306 of anodizable portion 302. Anodic film 312 is formed on anodizable portion 302. Adhesive 308 is applied to internal surfaces within pocket 306 prior to inserting non-anodizable portion 304 such that adhesive 308 is between non-anodizable portion 304 and anodizable portion 302. Adhesive can be any suitable adhesive, including epoxy and other liquid adhesives. In some embodiments, clearance 310 is provided between non-anodizable portion 304 and anodizable portion 302 to accommodate excess portions of adhesive 308.

Figure 3B:
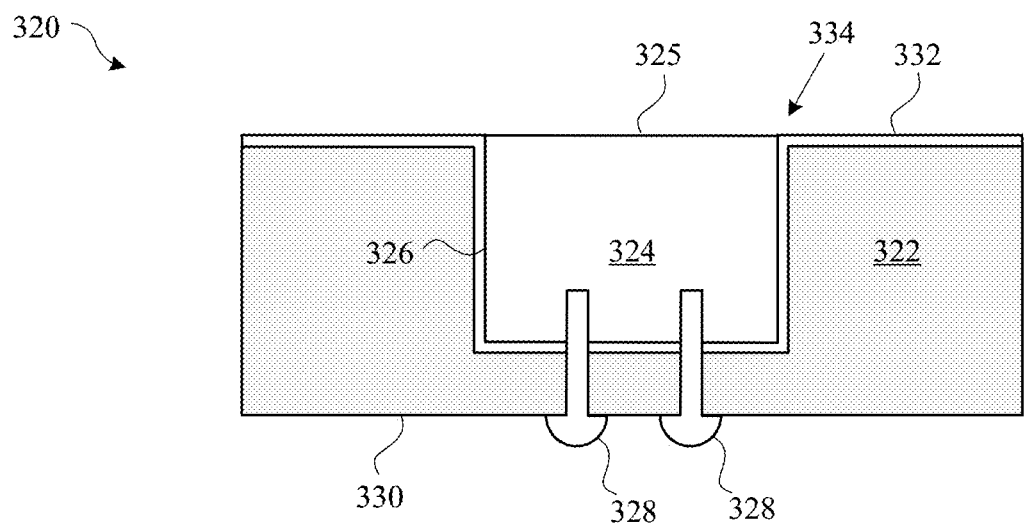

FIG. 3B shows part 320, which includes non-anodizable portion 324 inserted within pocket 326 of anodizable portion 322, with anodic film 332 formed on anodizable portion 322. Fasteners 328 are driven through anodizable portion 322 and a portion of non-anodizable portion 324 via surface 330 securing non-anodizable portion 324 within pocket 326 and to anodizable portion 322. Fasteners 328 can be stop short of penetrating through surface 325 of non-anodizable portion 324 in order to prevent marring of continuous surface 334. Fasteners 328 can be any suitable type of fastener, including pins or screws, and can be made of any suitable material. In some embodiments, fasteners 328 are metal pins that are bent or swaged at surface 330. In other embodiments, fasteners 328 are made of plastic that are fused with non-anodizable portion 324 by heat staking methods. In some embodiments, fasteners 328 are threaded.

Figure 3C:
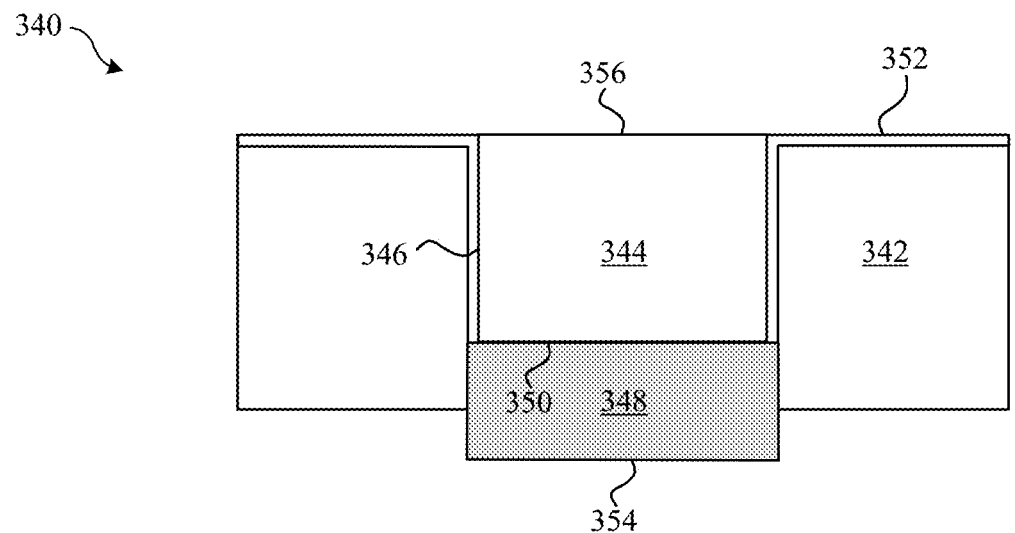

FIG. 3C shows part 340, which includes non-anodizable portion 344 inserted within pocket 346 of anodizable portion 342, with anodic film 352 formed on anodizable portion 342. Part 340 includes support piece 348 that is positioned adjacent non-anodizable portion 344 at interface 350. Non-anodizable portion 344 can be coupled with support piece 348 at interface 350 using any suitable mechanism. For example, an adhesive can be applied between non-anodizable portion 344 and support piece 348 at interface 350. Alternatively or additionally, one or more fasteners can be driven through support piece 348 and a portion of non-anodizable portion 344, similar to fasteners 328 described above with reference to FIG. 3B. For example, the fasteners can be metal pins or screws or plastic fasteners that are fused with non-anodizable portion 344 and/or support piece 348 using heat staking methods. Support piece 348 can be made of any suitable material. In some embodiments, support piece 348 is made of a material suitably rigid for providing rigid support for non-anodizable portion 344 within pocket 346.

In some embodiments, support piece 348 is made of a material that can be welded with non-anodizable portion 344 at interface 350, using a laser welding process. For example, support piece 348 can be made of a laser-transparent material (e.g., transparent to infrared (IR) laser beam) and non-anodizable portion 344 can be made of a laser-absorptive material (e.g., absorbs IR laser beam energy). A laser beam (e.g., IR laser beam) can be directed toward surface 354 of support piece 348 such that the laser beam transmits through support piece 348 until the laser beam reaches laser-absorptive non-anodizable portion 344 at interface 350. Energy from the laser beam will melt non-anodizable portion 344 at interface 350 and meld non-anodizable portion 344 to support piece 348 at interface 350. In this way, non-anodizable portion 344 can be secured to support piece 348 within pocket 346. In other embodiments, non-anodizable portion 344 is made of a laser-transparent material and support piece 348 is made of a laser-absorptive material. The laser beam can then be directed at surface 356 of non-anodizable portion 344 such that the laser beam transmits through non-anodizable portion 344 and melds support piece 348 at interface 350. In other embodiments, non-anodizable portion 344 and support piece 348 are ultrasonically welded together at interface 350.

Figure 3D:
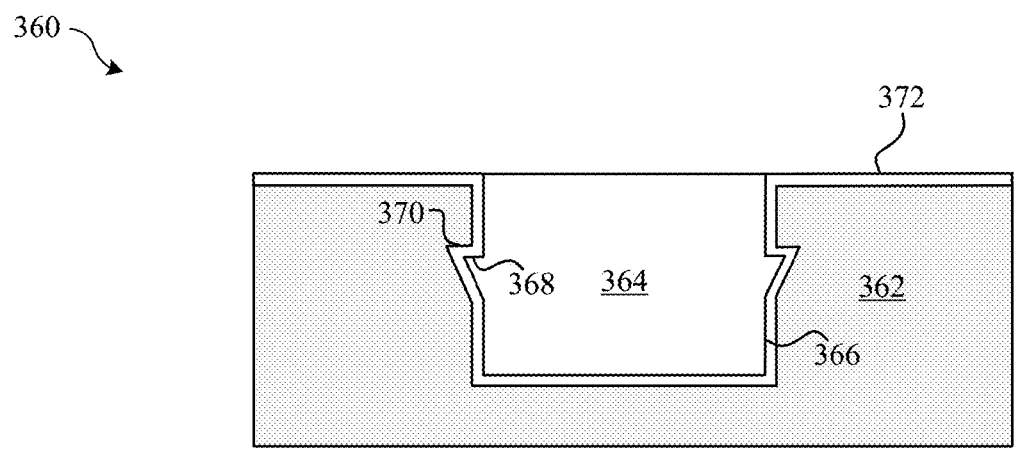

FIG. 3D shows part 360, which includes non-anodizable portion 364 inserted within pocket 366 of anodizable portion 362, with anodic film 372 formed on anodizable portion 362. Non-anodizable portion 364 includes snap-fit features 368 that each has an undercut geometry. Anodizable portion 362 includes corresponding features 370 within pocket 366 that each has a shape for pairing with a corresponding snap-fit feature 368. Snap-fit features 368 have sloped surfaces that allows non-anodizable portion 364 to slide within pocket 366 when non-anodizable portion 364 is inserted within pocket 366. The undercut geometry of snap-fit features 368 engage with corresponding features 370 and secure non-anodizable portion 364 within pocket 366 once inserted. Note that snap-fit features 368 and corresponding features 370 can have any suitable shape for sufficiently engaging and securing non-anodizable portion 364 within pocket 366 and are not limited to the particular shapes illustrated in FIG. 3D. In addition, the number of matching snap-fit features 368 and corresponding features 370 can vary depending on design requirements.

It should be noted that one or more of the securing mechanisms described above with reference to FIGS. 3A-3D can be combined in order to secure a non-anodizable portion within a pocket of an anodizable portion, in accordance with described embodiments. For example, the snap-fit features 368 of FIG. 3D can be combined with use of an adhesive and/or fastener to further secure non-anodizable portion 364 within pocket 366. Likewise, the welding methods described above with reference to FIG. 3C can be combined with the use of an adhesive and/or fastener to further secure non-anodizable portion 344 within pocket 346.

Figure 4A:
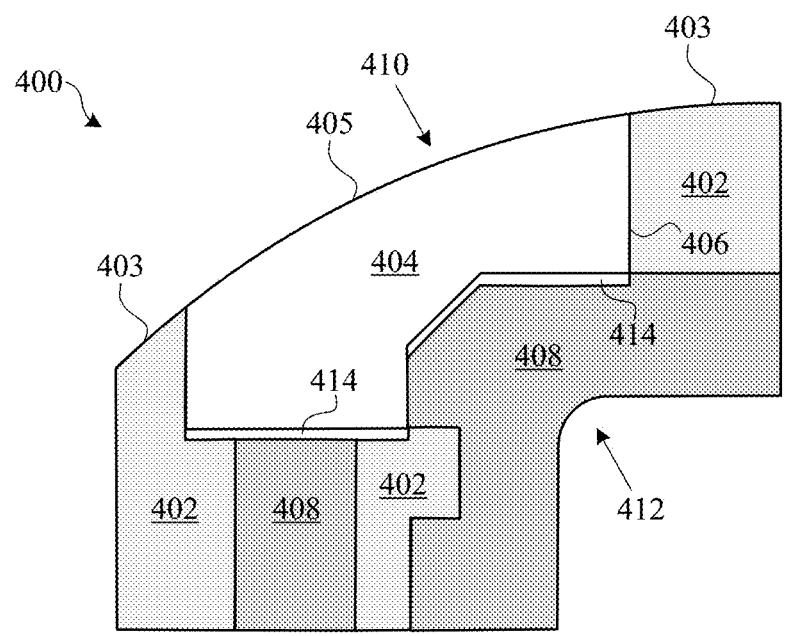
FIGS. 4A-4E show a composite part manufactured using a fixture, in accordance with described embodiments.

As described above, according to some embodiments a fixture can be used to properly position a non-anodizable portion with an anodizable portion. To illustrate, FIGS. 4A-4E show cross-section views of portions of part 400 manufactured using a fixture in accordance with described embodiments. FIG. 4A shows part 400, which includes anodizable portion 402 and non-anodizable portion 404 that is positioned within pocket 406 of anodizable portion 402. Part 400 also includes support piece 408, which provides additional support for non-anodizable portion 404 within pocket 406. In some embodiments, clearance 414 is provided between portions of non-anodizable portion 404 and portions of anodizable portion 402 and support piece 408 in order accommodate adhesive that is applied in a subsequent repositioning process. In addition, clearance 414 can also be provided to make room for portions of non-anodizable portion 404 during the subsequent repositioning process, which is described in detail below with reference to FIG. 4C.

Part 400 has continuous surface 410 that includes surface 403 of anodizable portion 402 and surface 405 of non-anodizable portion 404. Continuous surface 410 can be formed by co-machining surface 403 and surface 405 using, for example, one or more cutting, milling, polishing, etching, and buffing operations. In some embodiments, continuous surface 410 has a spline shape. In some embodiments, continuous surface 210 corresponds to an exterior surface of an enclosure of an electronic device and surface 412 corresponds to an internal surface of the enclosure. One or more of non-anodizable portion 404 and support piece 408 can be made of RF transparent plastic(s) that allow RF transmission to/from a RF antenna housed within the enclosure.

Figure 4B:
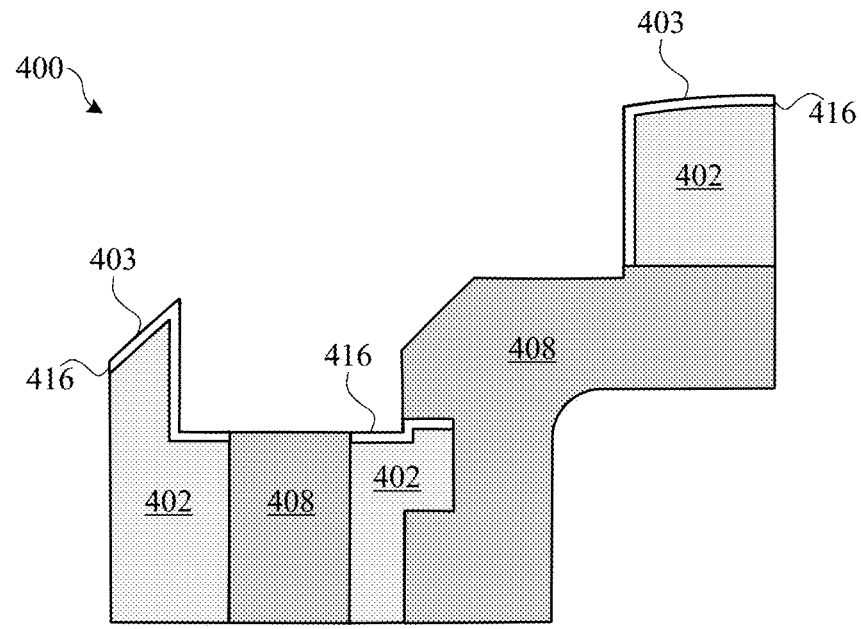

FIG. 4B shows part 400 after non-anodizable portion 404 is removed from pocket 406 and part 400 is exposed to an anodizing process. During the anodizing process, exposed surfaces of anodizable portion 402 are converted to anodic film 416. Thus, surface 403 corresponds to a surface of anodic film 416. In some embodiments, support piece 408 is coupled to anodizable portion 402 during the anodizing process. Thus, in these embodiments support piece 408 should be made of a material that is substantially resistant to anodizing chemical and anodizing conditions, such as a PEEK or PPSU plastic material. After anodic film 146 is formed, anodic film 416 can be optionally dyed to impart a desired color to anodic film 416. In some embodiments an adhesive, such as epoxy, is deposited within pocket 406.

Figure 4C:
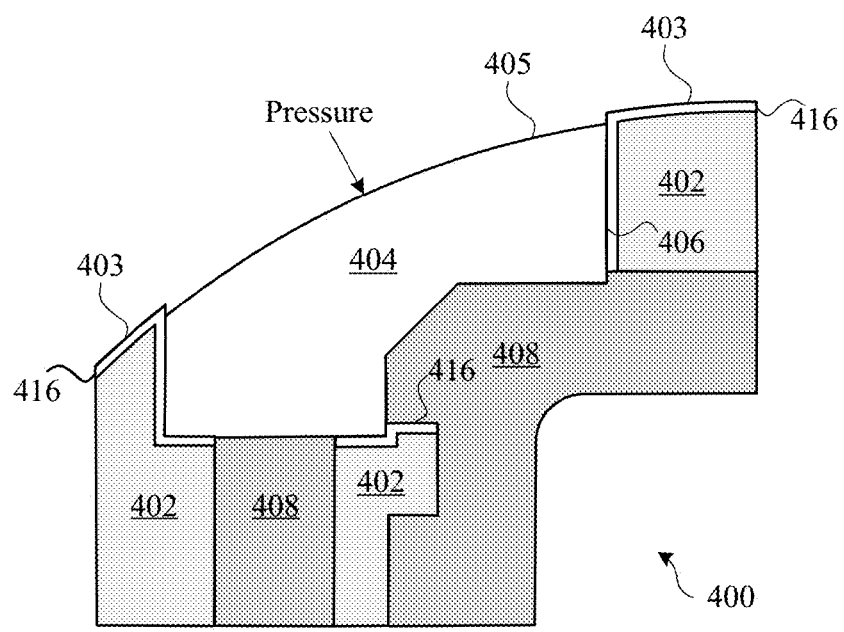

FIG. 4C shows part 400 after non-anodizable portion 404 is repositioned within pocket 406. In some embodiments, pressure is applied to non-anodizable portion 404 in a first direction such that non-anodizable portion 404 is pushed into pocket 406 in an inset position, which is a farther distance within pocket 406 compared to when co-machined at FIG. 4A. In the inset position, surface 405 of non-anodizable portion 404 is inset a distance from surface 403 of anodic film 416. In some embodiments, non-anodizable portion 404 is pushed into pocket 406 such that clearance 414 is consumed. In some embodiments, pressure is applied to non-anodizable portion 404 using a soft tooling technique where tools made of a relatively soft material such as silicone are used to position, insert and/or press non-anodizable portion 404 within pocket 406. This way, anodic film 416 is prevented from damage due to contact with harder tools.

Figure 4D:
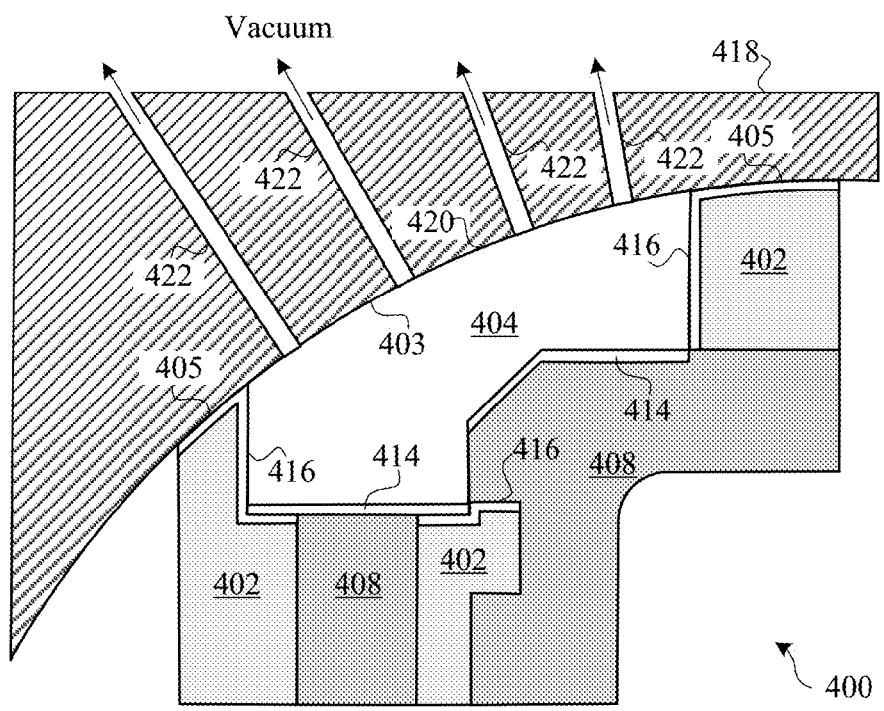

After non-anodizable portion 404 has been positioned within pocket 406, at FIG. 4D part 400 is positioned within fixture 418 such that surface 403 of anodic film 416 is positioned against datum surface 420 of fixture 418. Datum surface 420 has a shape that corresponds to the shape of contoured surface 410. For example, if continuous surface 410 has a spline shape, datum surface 420 will have a corresponding spline shape. Note that datum surface 420 can have any suitable shape that corresponds to a shape of a contoured surface of a part. For example, in other embodiments where the contoured surface is substantially flat or planar, such as described above with reference to FIGS. 2A-2F, datum surface 420 will have a correspondingly flat or planar shape.

After part 400 is placed within fixture 418, a second pressure can be applied in second direction opposite the first direction in order to pull non-anodizable portion 404 form its inset position and reform continuous surface 410. In some embodiments, this is accomplished using vacuum pressure. For example, fixture 418 includes holes 422 that have openings at datum surface 420. Holes 422 are connected with a vacuum system such that vacuum suction pulls non-anodizable portion 404 from the inset position shown in FIG. 4C and realigns surface 405 of non-anodizable portion 404 with surface 403 of anodic film 416. The number and size (diameter) of holes 422 can vary depending on the size of non-anodizable portion 404. In some cases, when surface 405 of non-anodizable portion 404 is realigned with surface 403 of anodic film 416, clearance 414 is reformed.

Figure 4E:
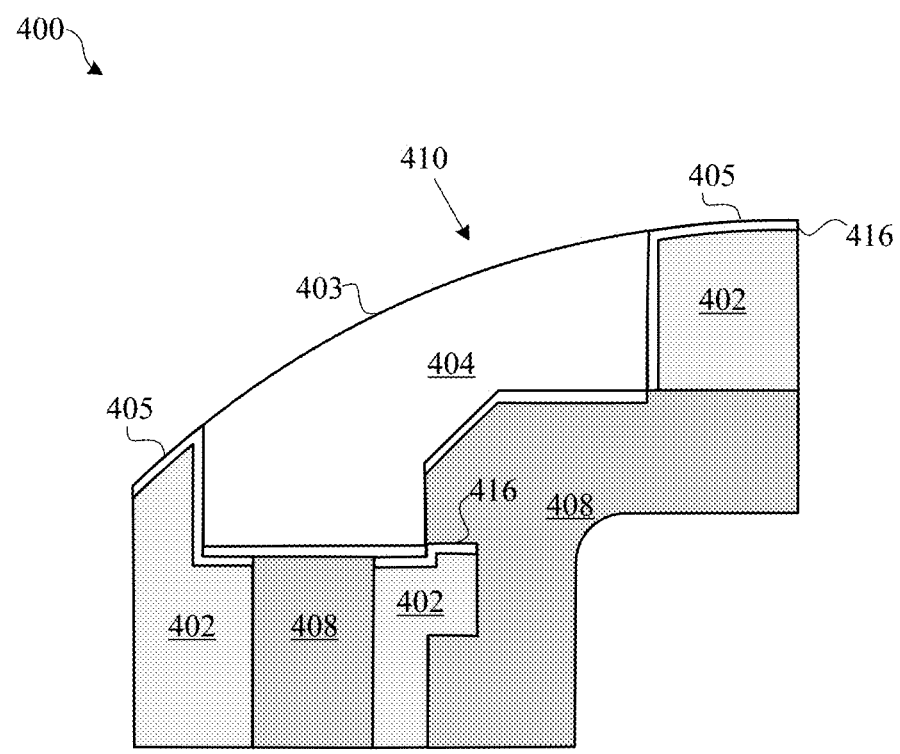

After non-anodizable portion 404 is realigned, one or more additional methods can be implemented to secure non-anodizable portion 404 within pocket 406. For example, one or more of the securing mechanisms described above with reference to FIGS. 3A-3D can be implemented. In embodiments where an adhesive is positioned within clearance 414, the adhesive can be allowed to cure, thereby fixing non-anodizable portion 404 within pocket 406. In some embodiments, anodic film 405 can be dyed to impart a desired color to anodic film 405. FIG. 4E shows part 400 after being removed from fixture 418. As shown, surface 403 of anodic film 416 is realigned with surface 405 of non-anodizable portion 404 forming contoured surface 410 that does not include offsets. In addition anodic film 416 is cosmetically appealing and free of visible defects.

Figure 5:
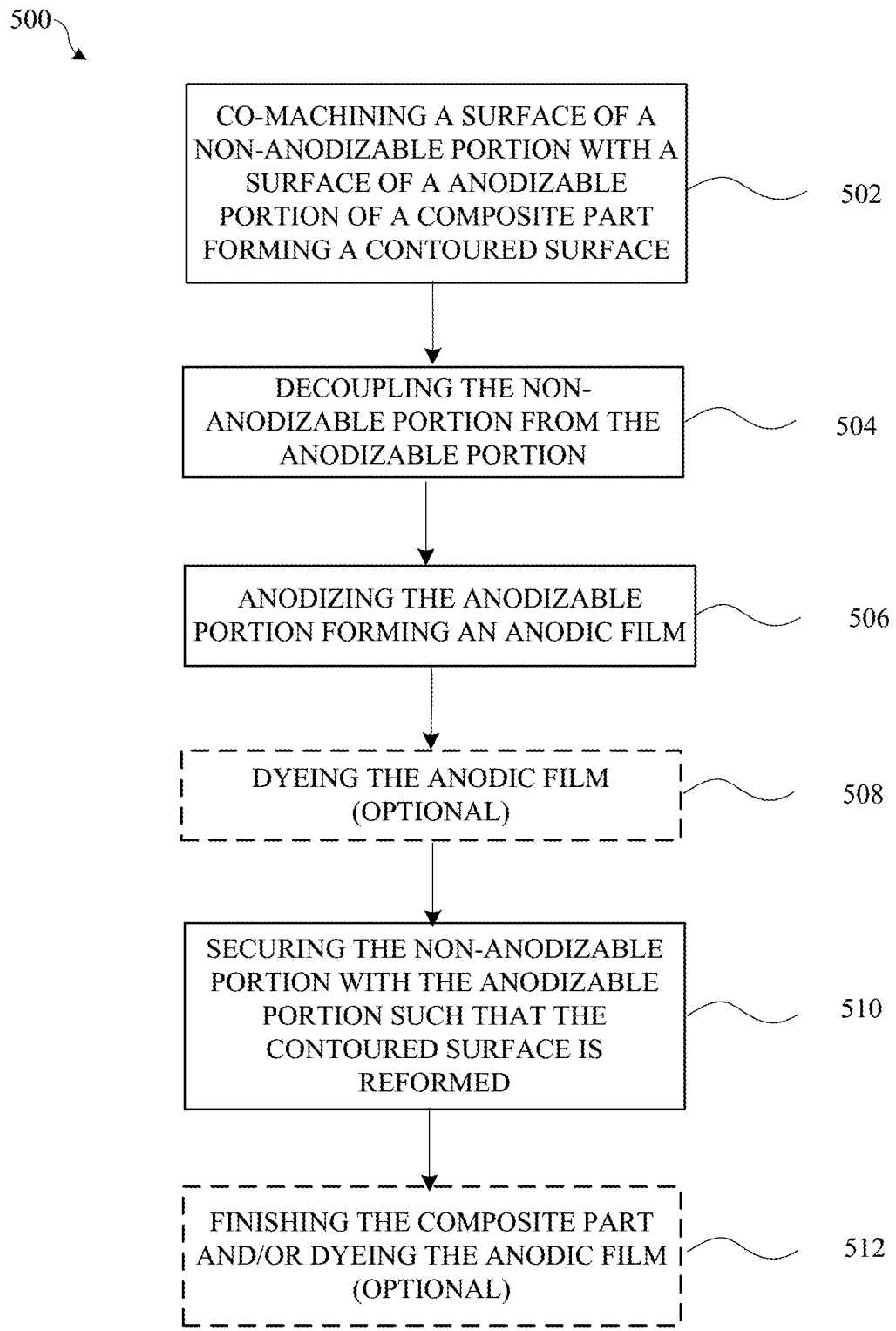
FIG. 5 shows a flowchart indicating a high-level process for forming a composite part in accordance with embodiments described with reference to FIGS. 1A-4E.

FIG. 5 shows flowchart 500 indicating a high-level process for forming a composite part that includes a non-anodizable portion coupled with an anodizable portion in accordance embodiments described above with reference to FIGS. 1A-4E. The anodizable portion can be made of any suitable anodizable material, such as aluminum and suitable alloys thereof. The non-anodizable portion can be made of any suitable material that is generally not capable of forming an anodic film, including plastic materials. In some embodiments, the plastic material is an RF transparent plastic material. In some embodiments, the non-anodizable portion is positioned within a pocket of the anodizable portion.

At 502, a surface of the non-anodizable portion is co-machined with a surface of the anodizable portion forming a contoured surface. The co-machining can include one or more machining operations, including suitable cutting, milling, polishing, etching, and buffing operations. The contoured surface can have any suitable shape, including substantially planar or curved. In some embodiments, the contoured surface has a spline shape. At 504, the non-anodizable portion is decoupled from the anodizable portion. In embodiments where the non-anodizable portion is positioned within a pocket, the non-anodizable portion is removed from the pocket.

At 506, the anodizable portion is anodized forming an anodic film on at least the surface of the anodizable portion that was co-machined. In some embodiments, the anodic film is formed on surfaces within the pocket of the anodized portion. Since the non-anodizable portion is not coupled with the anodizable portion, there are no gaps at interfaces between the anodizable portion and non-anodizable portion for chemicals related to the anodizing process can get trapped. At 508, the anodic film is optionally dyed using one or more dyeing operations. The one or more dyes can infuse unimpeded within pores of the anodic film without formation of visible defects related to trapped anodizing-related residues.

At 510, the non-anodizable portion is secured to the anodizable portion such that the contoured surface is reformed. Any suitable securing mechanism can be used, including using one or more press fit, adhesive, fastener(s), welding, snap fit, and heat stake methods described above. At 512 the composite part can optionally be finished to remove any offsets between the surface of the non-anodizable portion and the anodizable portion that may have been formed and to assure that the contoured surface is retained. The finishing method should be gentle enough not to visibly damage the anodic film. Suitable methods may include a buffing or light polishing process. The anodic film can optionally be dyed. In some embodiments, this is the first time the anodic film is dyed. In other embodiments, the anodic film is dyed for a second or subsequent times.

Figure 6A:
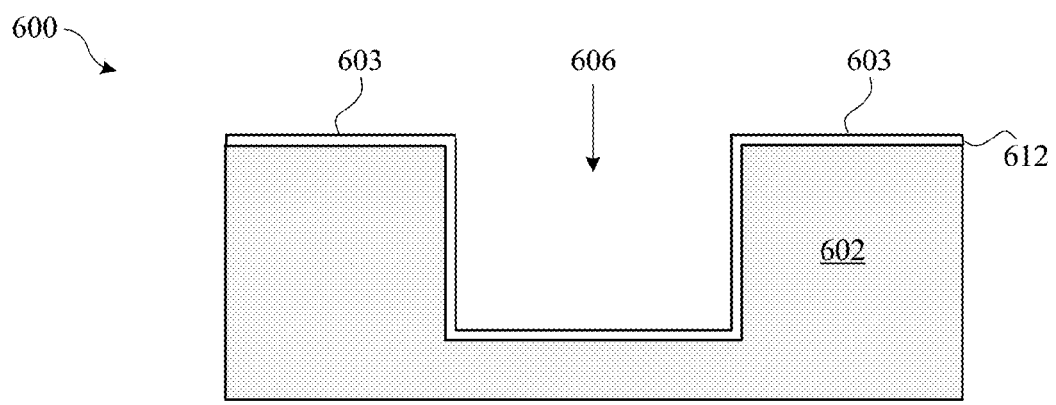
FIGS. 6A-6C show a composite part manufactured with a machining process implemented after an anodizing process is performed, in accordance with described embodiments.
Figure 6B:
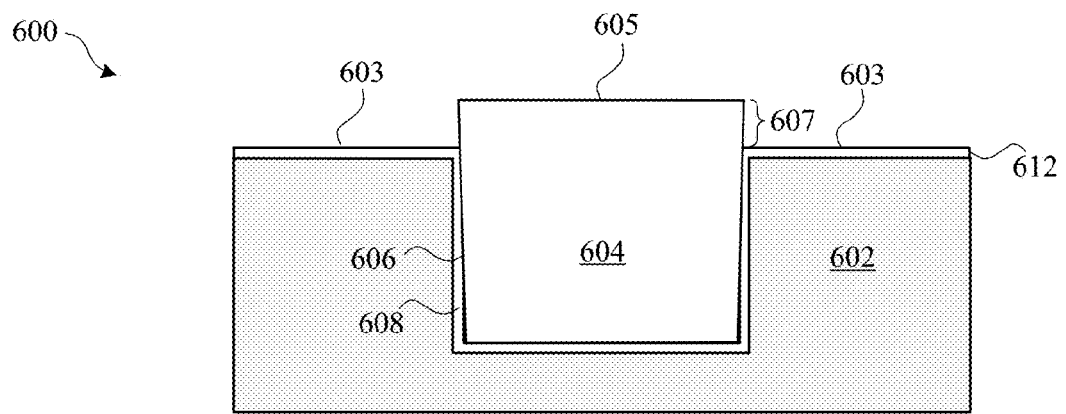
Figure 6C:
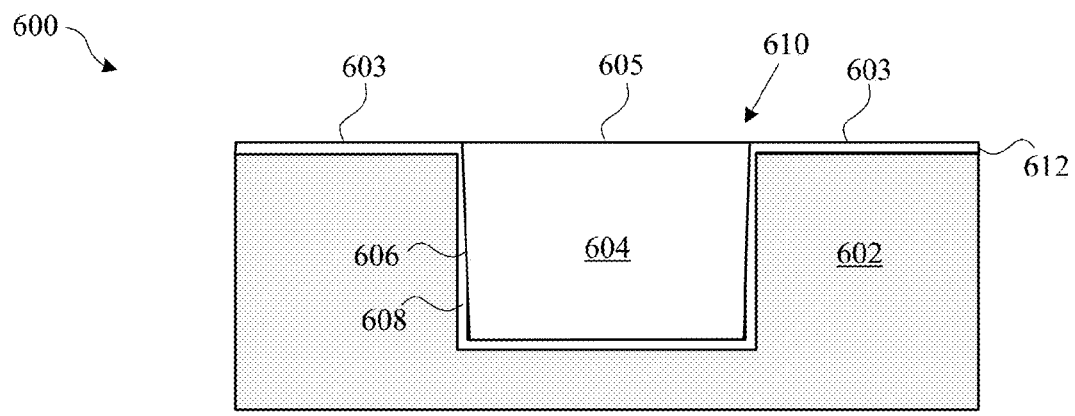

According to some embodiments, a machining process is implemented after an anodizing process is performed. To illustrate FIGS. 6A-6C show cross-section views of part 600 manufactured using such a process. FIG. 6A shows anodizable portion 602 after an anodizing process such that anodic film 612 is formed. Surface 603 of anodic film 602 corresponds to an exterior surface of part 600. Anodizable portion 602 includes pocket 606, which has a size and shape for accepting a non-anodizable portion. After anodizing, anodic film 612 is optionally dyed using one or more anodic film dyeing operations and/or sealed using one or more sealing operations.

FIG. 6B shows part 600 after non-anodizable portion 604 is positioned within pocket 606. In some embodiments, non-anodizable portion 604 is inserted using a soft tooling technique, as described above, so as not to damage anodic film 612. Non-anodizable portion 604 can be formed to have a shape such that non-anodizable portion 604 snuggly fits within pocket 606. In some embodiments, non-anodizable portion 604 has a shape such that clearance 608 is provided between non-anodizable portion 604 and anodizable portion 602. In some embodiments, one or more securing mechanisms, such as one or more press fit, adhesive, fastener(s), welding, snap fit, and heat stake methods described above, is used to secure non-anodizable portion 604 within pocket 606.

As shown, non-anodizable portion 604 has surface 605 that is offset or sits proud a distance 607 with respect to surface 203 of anodic film 612. FIG. 6C shows part 600 after a removal process where a portion of non-anodizable portion 604 corresponding to distance 607 is removed. After the removal process, surface 605 of non-anodizable portion 604 is flush with and cooperates with surface 603 of anodic film 612 to form contoured surface 610. The removal process should be one that preferentially removes non-anodizable portion 604 over anodic film 612 and does not substantially mar anodic film 612. Thus, a relatively gentle removal process is preferred. In particular embodiments, a cutting, grinding, or polishing operation using an abrasive that preferentially removes the material of non-anodizable portion 604 is used. The abrasive contacts both surface 605 and surface 603 but is made of material that preferentially removes non-anodizable portion 604. The nature and type of the abrasive will depend on the material of non-anodizable portion 604 as well as the hardness of anodic film 612. The materials chosen for non-anodizable portion 604 can vary depending on application requirements as well as the type of abrasive used. In some applications suitable include polycarbonate, ABS, PEI, PPSU, PS, and PEEK.

Figure 7:
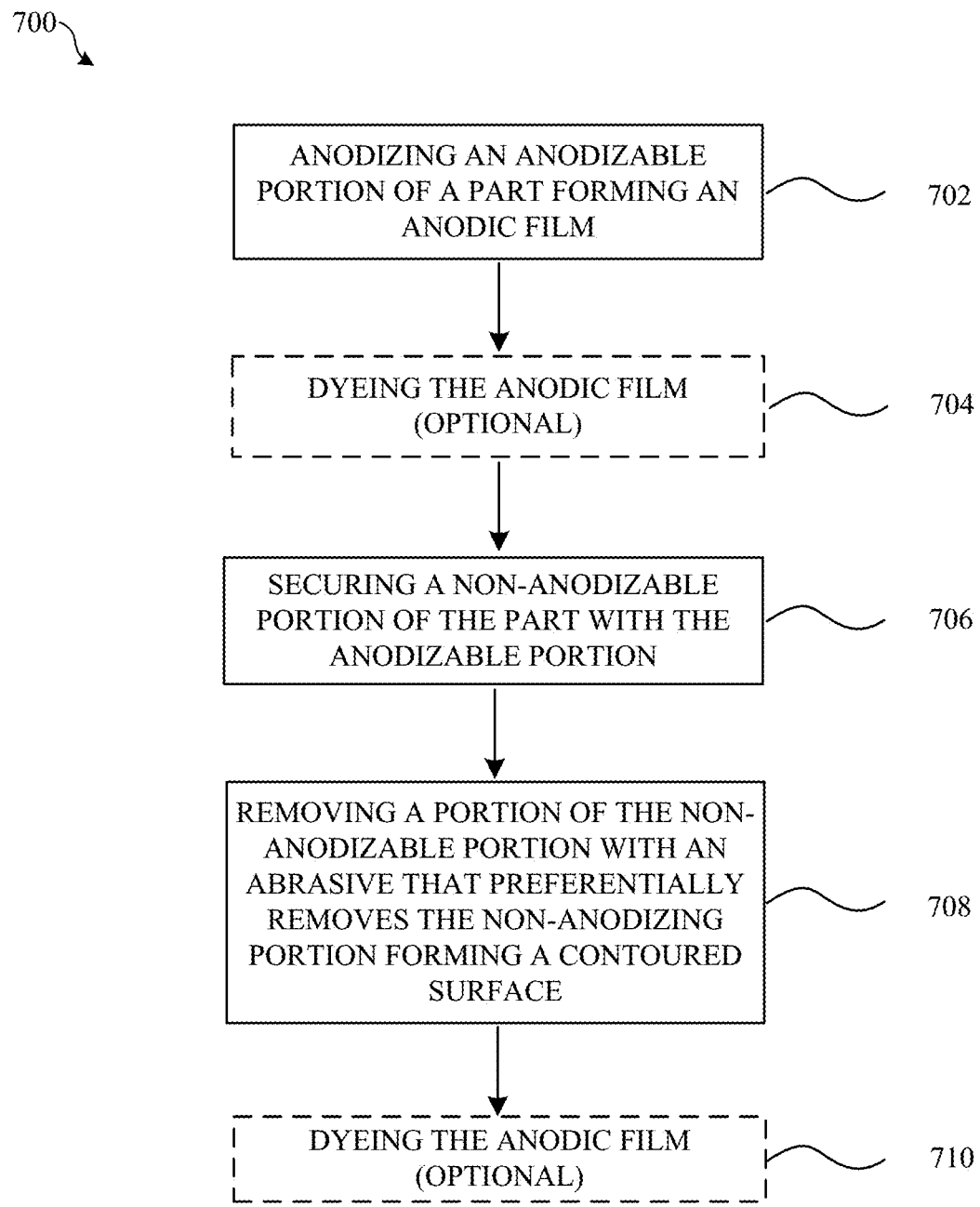
FIG. 7 shows a flowchart indicating a high-level process for forming a composite part in accordance with embodiments described with reference to FIGS. 6A-6C.

FIG. 7 shows flowchart 700 indicating a high-level process for forming a composite part that includes a non-anodizable portion coupled with an anodizable portion in accordance with embodiments described above with reference to FIGS. 6A-6C. At 702, the anodizable portion is anodized forming an anodic film on the anodizable portion. In some embodiments, the anodic film has a surface corresponding to an exterior surface of the part. At 704, the anodic film is optionally dyed using one or more anodic dyeing operations.

At 706, the non-anodizable portion is secured with the anodizable portion. The non-anodizable portion has a shape that is approximate to a final shape of the non-anodizable portion. This way, a minimal amount of material from the non-anodizable portion needs to be removed during a subsequent removal process. In some embodiments, the non-anodizable portion is secured within a pocket of the anodizable portion. Any suitable securing mechanism can be used, including using one or more press fit, adhesive, fastener(s), welding, snap fit, and heat stake methods described above.

At 708, a portion of the non-anodizable portion is removed such that the non-anodizable portion takes on the final shape. The removing process can include contacting the surface of the anodic film and a surface of the non-anodizable portion with an abrasive material that preferentially removes non-anodizable portion over the anodic film such that the surface of the anodic film and the surface of the non-anodizable portion cooperate to form a contoured surface. At 710, the composite part can be optionally dyed. In embodiments where the anodic film is not dyed at 704, this corresponds to the first time that the anodic film is dyed. In embodiments where the anodic film is dyed at 704, the anodic film can be dyed for a second or subsequent number of times.

As described above, in some cases methods involve filling the gap at the interface between the non-anodizable and anodizable portions and then anodizing the composite part. FIGS. 8A-8E show cross-section views of a part 800 manufactured using such a gap filling process. At FIG. 8A, adhesive layer 801 is deposited onto interior surfaces of pocket 806 of anodizable portion 802. Adhesive layer 801 can include any suitable material, including epoxy material. At FIG. 8B, non-anodizable portion 804 is positioned within pocket 806 such that adhesive layer 801 secures non-anodizable portion 804 to anodizable portion 802. In some embodiments, additional securing mechanisms such as fastener(s), welding, snap fit, and heat stake methods, such as described above, can be used. In some embodiments, clearance 508 is provided to accommodate adhesive layer 801. Adhesive layer 801 can fill gaps 807 that exist at the interface between non-anodizable portion 804 and anodizable portion 802.

Figure 8A:
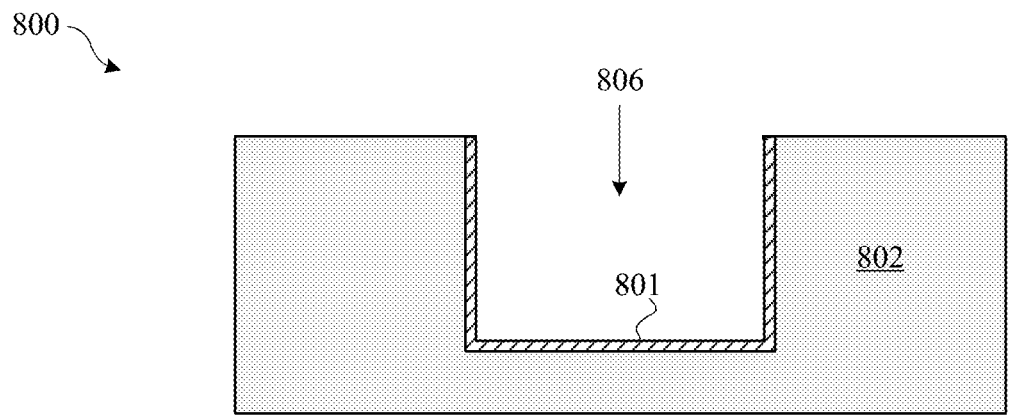
FIGS. 8A-8E show a composite part manufactured using a gap filling process.
Figure 8B:
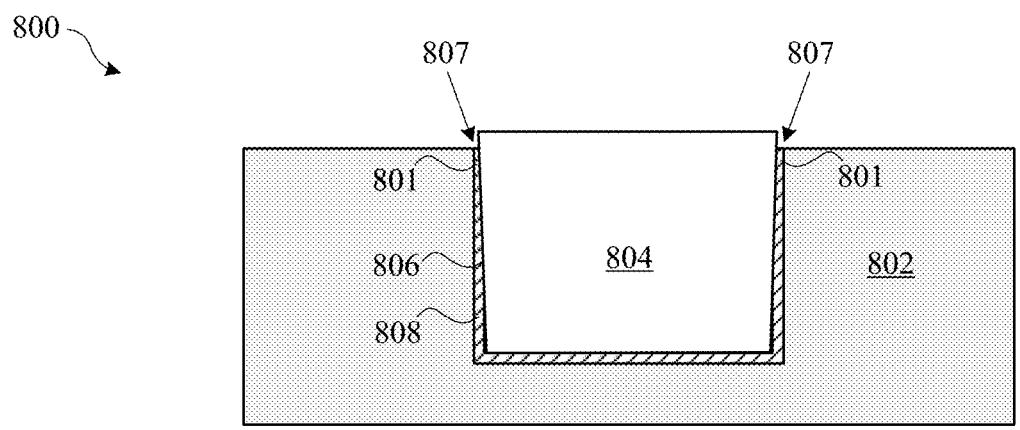
Figure 8C:
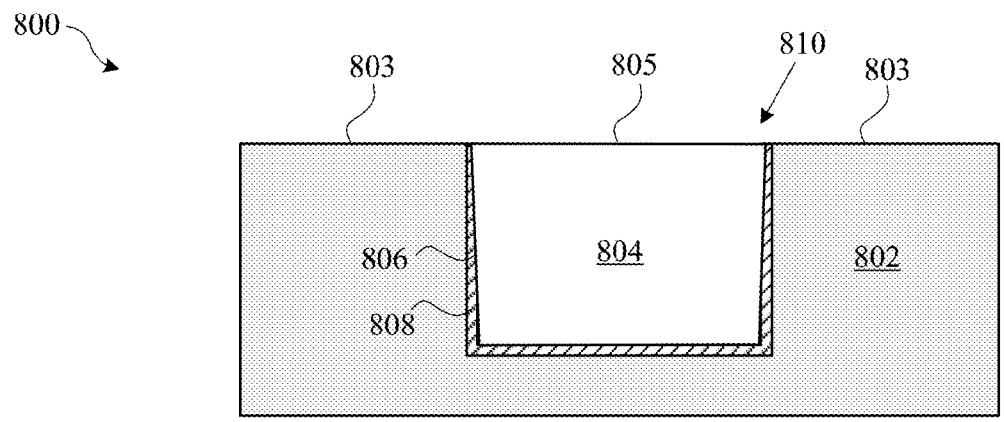
Figure 8D:
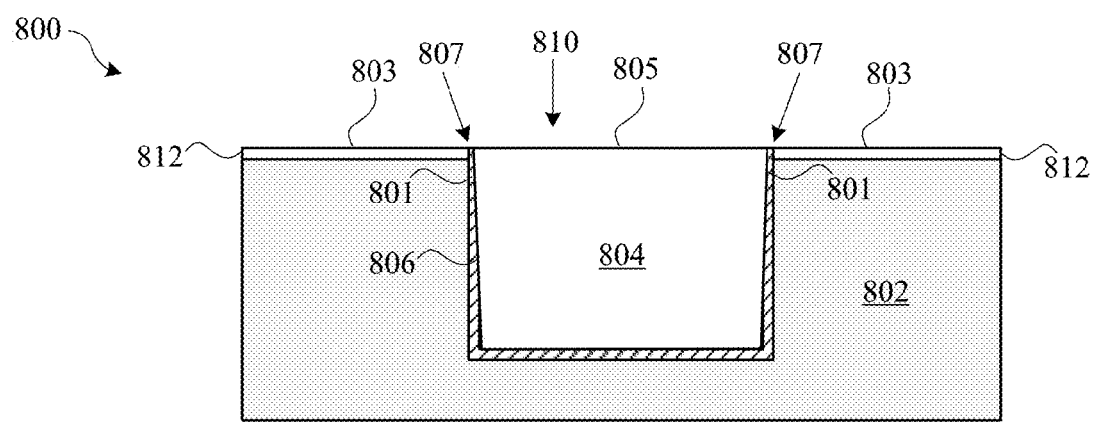
Figure 8E:
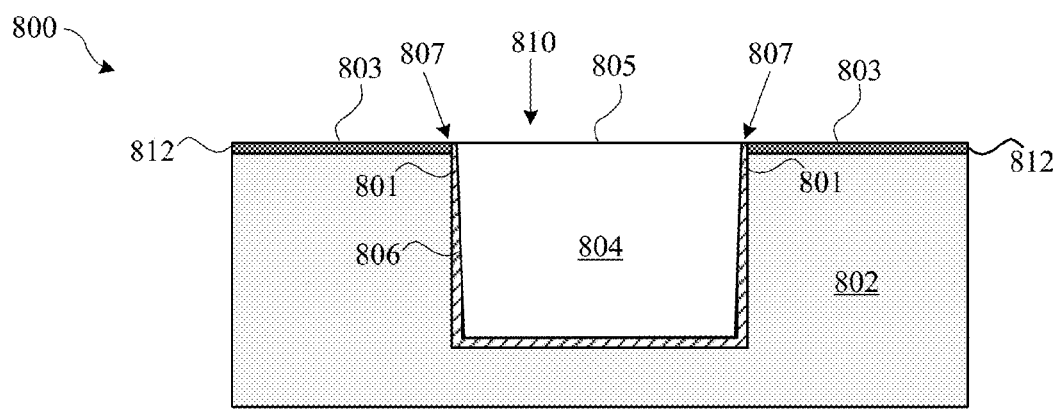

At FIG. 8C, surface 805 of non-anodizable portion 804 is co-machined with surface 803 of anodizable portion 802 forming contoured surface 810. Contoured surface 810 can have any suitable shape, including a planar shape or curved (e.g., spline) shape. Continuous surface 810 can be formed using any suitable shaping operation, including one or more cutting, milling, polishing, etching, and buffing operations. Once contoured surface 810 is formed, at FIG. 8D part 800 is anodized forming anodic film 812 on exposed surfaces of anodized portion 802. Since anodizing is a conversion process, surface 803 now corresponds to an exposed surface of anodic film 812 and contoured surface 810 is retained.

Since gaps 807 are filled with adhesive layer 801, the anodizing chemicals from the electrolytic bath used during anodizing are prevented from entering and getting trapped within the gaps 807.

At 8E, anodic film is optionally dyed using an anodic dyeing operation to give anodic film 812 a desired color. Since gaps 807 are free from anodizing-related chemicals, the dye can become evenly infused within anodic film 812 without forming visible defects near gaps 807. Part 800 also retains contoured surface 810 giving part 800 a continuous and aesthetically appealing look and feel.

Figure 9:
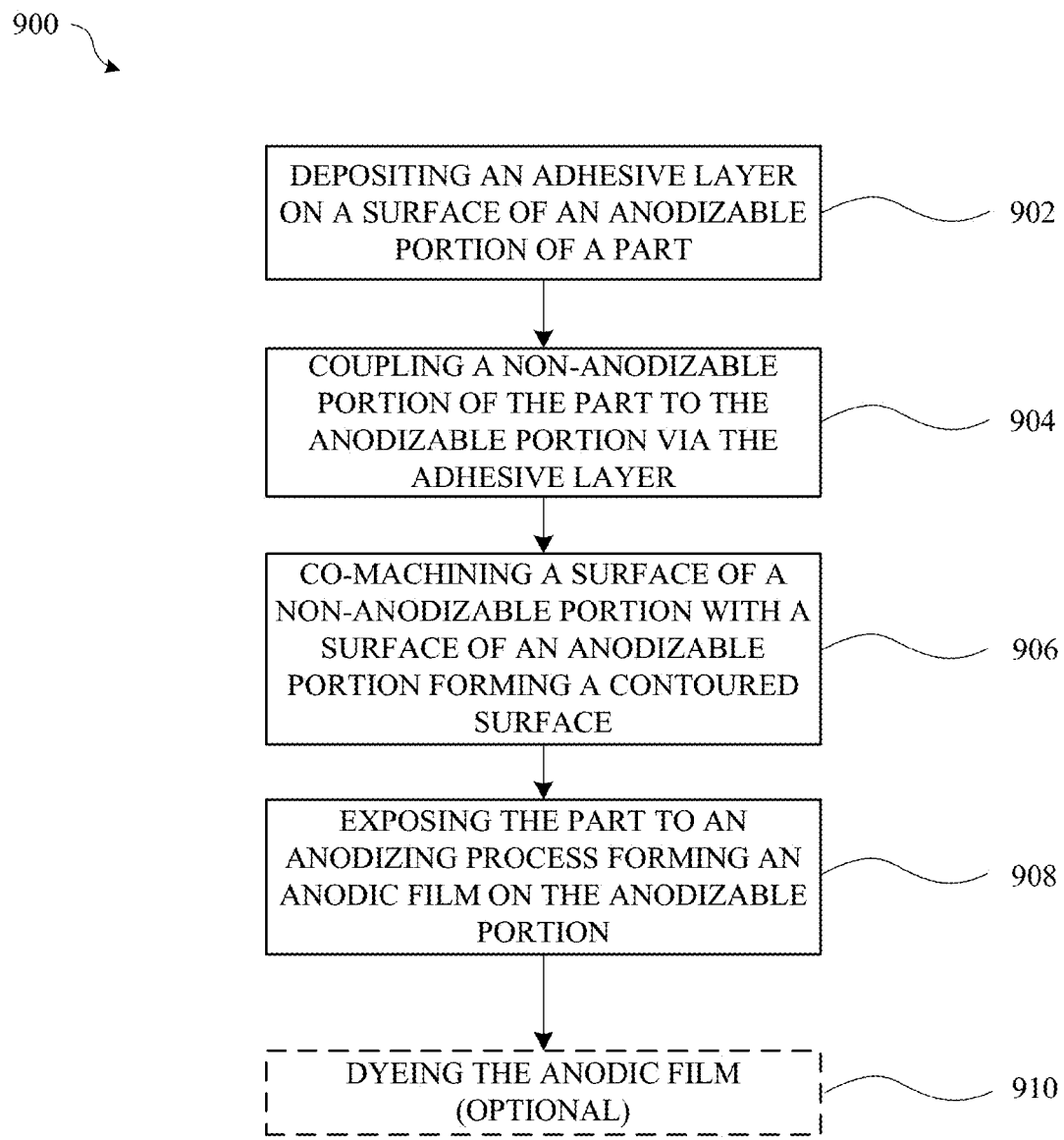
FIG. 9 shows a flowchart indicating a high-level process for forming a composite part in accordance with embodiments described with reference to FIGS. 8A-8E.

FIG. 9 shows flowchart 900 indicating a high-level process for forming a composite part that includes a non-anodizable portion coupled with an anodizable portion in accordance embodiments described above with reference to FIGS. 8A-8E. At 902, an adhesive layer is deposited on a surface of the anodizable portion. In some embodiments, the surface corresponds to interior surfaces of a pocket formed within the anodizable portion. The adhesive can include any suitable material, such as epoxy. The thickness of the adhesive layer can be chosen to provide sufficient blockage of anodizing-related chemicals in a subsequent anodizing process.

At 904, the non-anodizable portion of the part is coupled to the anodizable portion via the adhesive layer. In some embodiments, this involves inserting the non-anodizable portion within the pocket of the anodizable portion. In some cases, a clearance between the non-anodizable portion and the anodizable portion is provided in order to accommodate excess adhesive material of the adhesive layer. In some cases, the non-anodizable portion is further secured to the anodizable portion using one or more fasteners, press fit, weld, snap fit, and heat stake methods.

At 906, a surface of the non-anodizable portion is co-machined with a surface of the anodizable portion forming a contoured surface. The contoured surface can correspond to an exterior surface of the part. At 908, the part is exposed to an anodizing process such that an anodic film is formed on the anodizable portion. The adhesive layer prevents entry of chemicals from the anodizing process from getting trapped within gaps at interfaces between the non-anodizable portion and the anodizable portion. After anodizing, the contoured surface corresponds to the surface of the non-anodizable portion and a surface of the anodic film. At 910, the anodic film is optionally dyed using one or more dyeing operations. The resultant composite part has an aesthetically pleasing contoured surface and is substantially free of visible defects.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method of manufacturing an enclosure that includes a non-anodizable portion coupled with an anodizable portion, the method comprising:
    co-machining a surface of the non-anodizable portion with a surface of the anodizable portion such that the surface of the non-anodizable portion cooperates with the surface of the anodizable portion to form a curved surface;
    decoupling the non-anodizable portion from the anodizable portion;
    subsequent to the decoupling, anodizing the anodizable portion, thereby forming an anodic film on the anodizable portion; and
    securing the non-anodizable portion with the anodizable portion such that the curved surface is reformed.

2. The method of claim 1, wherein the non-anodizable portion is positioned within a pocket of the anodizable portion.

3. The method of claim 1, further comprising dyeing the anodic film.

4. The method of claim 1, wherein the curved surface is a spline shaped surface.

5. The method of claim 1, further comprising
    applying a first pressure in a first direction to the non-anodizable portion such that the surface of the anodizable portion is in an inset position with respect to the surface of the non-anodizable portion; and
    applying a second pressure in a second direction opposite the first direction to the non-anodizable portion such that the curved surface is reformed.

6. The method of claim 5, wherein the second pressure is a vacuum suction pressure.

7. The method of claim 5, further comprising:
    prior to applying the second pressure, positioning the enclosure adjacent a datum surface having a shape corresponding to the curved surface of the enclosure, wherein applying the second pressure comprises aligning the surface of the anodizable portion and the surface of the non-anodizable portion with the datum surface.

8. The method of claim 1, further comprising:
    prior to securing the non-anodizable portion with the anodizable portion, applying an adhesive between the non-anodizable portion and the anodizable portion such that the non-anodizable portion adheres to the anodizable portion.

9. The method of claim 1, wherein the enclosure further comprises a support piece positioned adjacent the non-anodizable portion.

10. The method of claim 9, wherein the non-anodizable portion is coupled with the support piece with an adhesive.

11. The method of claim 9, wherein the non-anodizable portion is coupled with the support piece using a welding process.

12. The method of claim 9, the non-anodizable portion is coupled with the support piece with one or more fasteners.

13. A method of manufacturing an enclosure for a consumer product that includes a non-anodizable portion and an anodizable portion, the method comprising:
    positioning the non-anodizable portion within a pocket of the anodizable portion;
    removing a portion of the non-anodizable portion and the anodizable portion such that the non-anodizable portion and the anodizable portion cooperate to form a curved surface;
    removing the non-anodizable portion from the pocket;
    subsequent to the removing, forming an anodic film on the anodizable portion; and
    reforming the curved surface by securing the non-anodizable portion within the pocket.

14. The method of claim 13, further comprising:
dyeing the anodic film prior to securing the non-anodizable portion with the anodizable portion.

15. The method of claim 13, wherein the non-anodizable portion is comprised of at least one of polycarbonate, ABS, PEI, PPSU, PS, or PEEK.

16. A method of manufacturing an enclosure for a consumer product, the enclosure including a non-metal portion and a metal portion, the method comprising:
positioning the non-metal portion adjacent the metal portion;
forming a contoured surface by co-machining the non-metal portion and the metal portion, wherein the contoured surface includes a non-metal surface of the non-metal portion and a metal surface of the metal portion;
decoupling the non-metal portion and the metal portion;
subsequent to the decoupling, forming an anodic film on the metal surface; and
coupling the non-metal portion with the metal portion such that the contoured surface is reformed.

17. The method of claim 16, wherein the contoured surface has a spline shape.

18. The method of claim 16, wherein positioning the non-metal portion adjacent the metal portion comprises:
adhering the non-metal portion with the metal portion using an adhesive.

19. The method of claim 16, wherein the non-metal portion is positioned within a pocket of the metal portion.

20. The method of claim 16, wherein coupling the non-metal portion with the metal portion includes positioning the contoured surface against a datum surface having a shape corresponding to the contoured surface.

* * * * *